United States Patent [19]

Isayama

[11] Patent Number: 4,591,883

[45] Date of Patent: May 27, 1986

[54] INK-JET PRINTER HEAD

[75] Inventor: Takuro Isayama, Tokyo, Japan

[73] Assignee: Ricoh Company, Ltd., Japan

[21] Appl. No.: 778,281

[22] Filed: Sep. 19, 1985

Related U.S. Application Data

[63] Continuation of Ser. No. 481,066, Mar. 31, 1983, abandoned.

[30] Foreign Application Priority Data

Mar. 31, 1982 [JP] Japan .................................. 57-53433
Apr. 29, 1982 [JP] Japan .................................. 57-71695
Jun. 30, 1982 [JP] Japan .................................. 57-114640

[51] Int. Cl.[4] .............................................. G01D 15/16
[52] U.S. Cl. ................................................ 346/140 R
[58] Field of Search ........................................ 346/140

[56] References Cited

U.S. PATENT DOCUMENTS 2,951,894 9/1960 Hirsch ............................. 346/140 X
3,452,360 6/1969 Williamson .......................... 346/140
4,364,070 12/1982 Matsuda .............................. 346/140
4,380,018 4/1983 Andoh ................................ 346/140
4,439,780 3/1984 DeYoung ............................ 346/140

OTHER PUBLICATIONS

Meier et al; Drop-On-Demand Ink Jet Printer, IBM TDB, vol. 19, No. 9, Feb. 1977, pp. 3357–3358.

*Primary Examiner*—Joseph W. Hartary
*Attorney, Agent, or Firm*—Guy W. Shoup

[57] ABSTRACT

A printer head for use in an on-demand type ink-jet printer includes a main body which is provided with a nozzle opening, through which ink is ejected to form flying ink droplets, and an ink passage extending to the nozzle opening for storing ink therein to be ejected through the nozzle opening. The printer head includes a pusher unit, which is supported away from the main body and which produces a deflection in response to a print signal supplied thereto, and a connection rod connected between the pusher unit and the main body. Thus, when the pusher unit produces a deflection, which is transmitted to the main body through the connection rod to change the volume of the ink passage, so that the ink inside the passage is partly ejected through the nozzle opening to form ink droplets.

14 Claims, 16 Drawing Figures

INK-JET PRINTER HEAD

This is a continuation of application Ser. No. 481,066, filed Mar. 31, 1983, now abandoned.

BACKGROUND OF THE INVENTION

1. Field of the Invention

This invention generally relates to an ink-jet printer, and, in particular, to an ink-jet printer head for use in ink-jet printers.

2. Description of the Prior Art

As shown in FIGS. 1 and 2, the so-called on-demand type ink-jet printer head for producing printing ink droplets on the basis of volume displacement is well known in the art, as disclosed in U.S. Pat. No. 3,946,398. The on-demand type printer head includes a main body or base plate 5, in which are defined a pressure chamber 2 and inlet and outlet passages 4*a*, 4*b*, and a top cover plate 6 provided with a hole corresponding in position to the pressure chamber 2. A pusher unit 3 comprised of a piezoelectric plate and a support plate for supporting thereon the piezoelectric plate is provided with its periphery fixed to the edge of the hole of the top cover plate 6 thereby forming a ceiling of the pressure chamber 2. An ink inlet pipe 7 is fixedly provided in fluidic communication with the ink inlet passage 4*a* and an ink supply tube 8 is sealingly fitted onto the mouth end of the ink inlet pipe 7. Although not shown specifically, the other end of the ink supply tube 8 is connected to an ink reservoir. A nozzle opening 1 is defined at the end of the outlet passage 4*b* opposite to the pressure chamber 2, and, thus, when the pusher unit 3 is deflected downward in response to a print signal applied thereto, the volume of the pressure chamber 2 is reduced therby causing the ink inside of the pressure chamber and thus the ink inside of the ink outlet passage 4*b* is pushed out into the air through the nozzle opening 1 thereby forming an ink droplet to be used in printing. As a characteristic of such a prior art ink-jet printer head, the ink droplets are formed by volume displacement and they are not deliberately charged, which allows to make the overall structure simpler.

However, since the periphery of the pusher unit 3 is fixedly attached to the edge or sidewall of the hole provided in the top cover plate 6, the pusher unit 3 must be made relatively large areawise in order to obtain a sufficient amount of deflection. This is particularly disadvantageous in the case of forming a multi-nozzle structure because the spacing between the two adjacent nozzles or nozzle openings tends to be large thereby limiting density or integration, which, in turn, results in poor resolution. Such a disadvantage mainly stems from the fact that the pusher unit 3 is so provided with its periphery all fixedly attached. This may be easily understood when reference is made to FIG. 3 which illustrates the structure of a multi-nozzle head constructed in accordance with the prior art concept. In FIG. 3, only three pressure chambers 2*a*–2*c* branching out the common ink supply passage 10 are shown for the purpose of illustration.

On the other hand, another structure similar to the above-mentioned on-demand type ink-jet printer head for ejecting non-charged ink droplets by volume displacement has been proposed as disclosed, for example, in Japanese Patent Publication, No. 53-45698 and also in Japanese Patent Laid-open Publication, No. 57-24262. In this approach, a pusher unit has been proposed to dispose at the location opposite to the nozzle opening thereby ejecting ink droplets in the direction of deflection of the pusher unit. However, this structure also suffers from the above-described disadvantages. That is, the pressure chamber is relatively large and the overall structure is rather complex, which tends to make a high density multi-nozzle structure difficult.

SUMMARY OF THE INVENTION

The above-described disadvantages are overcome with the present invention and a novel ink-jet printer head is hereby provided. In accordance with one aspect of the present invention, an electro-mechanical or magnetomechanical converting element such as a piezoelectric or magnetostrictive element, which is deflected in response to a print signal supplied thereto, is provided separately from the pressure chamber, and, thus, it does not constitute a part of the pressure chamber. With this structure, the electro-mechanical or magnetomechanical converting element may be made larger in size to obtain an increased deflection and yet it is also possible to provide a high density multi-nozzle structure thereby allowing to increase resolution in printed characters. Furthermore, in accordance with the present invention, there is a high degree of freedom in positioning a pusher unit, and, therefore, a plurality of pusher units may be arranged in staggered relationship to maintain compactness.

Therefore, it is a primary object of the present invention to provide an ink-jet printer head capable of being structured into a high density multi-nozzle structure.

Another object of the present invention is to provide an ink-jet printer head high in performance in forming ink droplets to be used in printing.

A further object of the present invention is to provide an ink-jet printer head which may be made smaller in size without impairing the characteristic of ink droplet production.

A still further object of the present invention is to provide a multi-nozzle ink-jet printer head which is high in density as well as simple in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
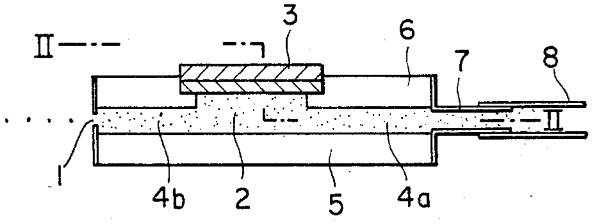
Fig. 1 PRIOR ART
FIG. 1 is a longitudinally cross sectional view of the prior art so-called on-demand type ink-jet printer head.
Figure 2:
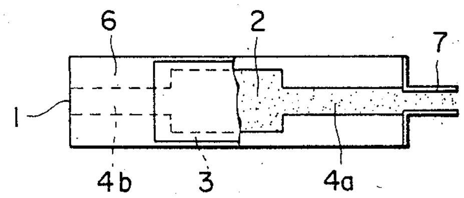
Fig. 2 PRIOR ART
FIG. 2 is a partially cross sectional, plan view of the printer head of FIG. 1 taken along line II—II in FIG. 1.
Figure 3:
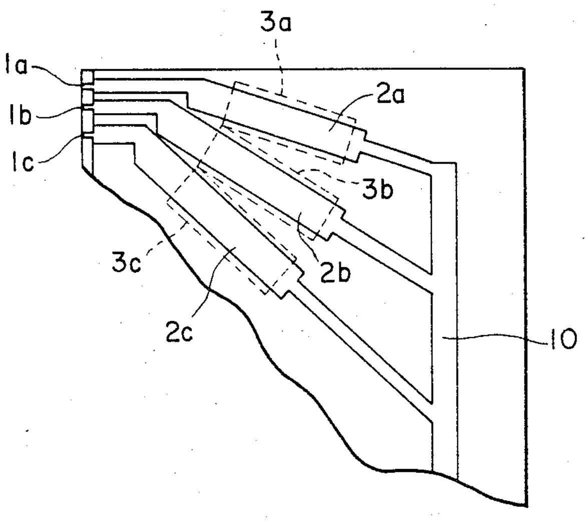
Fig. 3 PRIOR ART
FIG. 3 is a schematic illustration showing a prior art multi-nozzle printer head structure constructed by applying the concept of the prior art on-demand type printer head shown in FIGS. 1 and 2.
Figure 4:
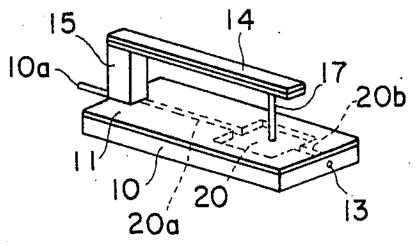
FIG. 4 is a perspective view of one embodiment of the ink-jet printer head constructed in accordance with the present invention.

Referring now to FIG. 4, there is shown a discrete ink-jet printer head constructed in accordance with one embodiment of the present invention. As shown, the ink-jet printer head comprises a main body or base plate 10 in which are defined a pressure chamber 20, an ink inlet passage 20*a* extending between the pressure chamber 20 and an ink inlet pipe 10*a*, and an ink outlet passage 20*b* extending between the pressure chamber 20 and a nozzle opening 13. On top of the base plate 10 is sealingly provided a top cover plate 11 so that the pressure chamber 20 and inlet and outlet passages 20*a* and 20*b* are generally enclosed. The top cover plate 11 may, for example, be made of a material such as stainless steel, nickel, glass, etc. It should be noted, however, that the top cover plate 11 must be thin enough or flexible enough to allow partial deflection of that portion of the plate 11 which forms the ceiling of the pressure chamber 20 when a pushing force is applied thereto. It should also be noted that the top cover plate 11 must have enough resiliency or elasticity such that it can be restored to its original shape upon release of the pushing force.

A support block 15 is fixedly mounted on the top cover plate 11 and one end of a pusher unit 14, formed as a straight strip, is fixedly attached to the top of the support block 15. The pusher unit 14 is so structured that it deflects upon application of a print signal in the form of an electrical or magnetic signal. For example, the pusher unit 14 may be structured to include a piezoelectric, magnetostrictive or thermally deformable element with or without a backing support, as well known in the art. A pusher pin 17 is fixedly mounted between the free end of the pusher unit 14, which is supported in a cantilever fashion, and the top cover plate 11, preferably at the center of that portion of the top cover plate 11 which also forms the ceiling of the pressure chamber 20. The pin 17 must be rigid enough to allow transfer of pushing force to the top cover plate 11 effectively. Preferably, the pin 17 is formed by a stainless steel rod.

With such a structure, the ink inlet pipe 10*a* is connected to an ink reservoir through an ink supply tube (not shown) and thus the pressure chamber 20 as well as the ink inlet and outlet passages 20*a* and 20*b* are filled with ink. Under the condition, when a print signal is supplied to the pusher unit 14 from a print control device (not shown) of a printer, the pusher unit 14 deflects downward thereby reducing the volume of the pressure chamber 20. As a result, the ink is ejected into the air through the nozzle opening 13 to form an ink droplet, which will then land on recording paper (not shown) placed opposite to the present printer head. Upon termination of the print signal, the pusher unit 14 is restored back into the original position and the pushing force applied against the top cover plate 11 is released. As a result, the top cover plate 11 returns to its original position and, thus, the volume of the pressure chamber 20 is increased to the original level.

Figure 5:
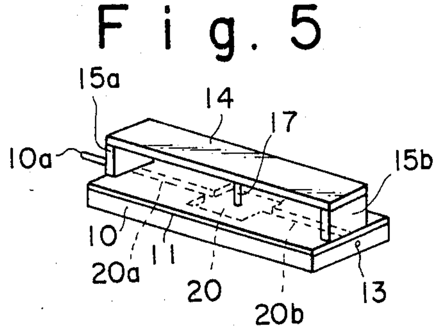
FIG. 5 is a perspective view of another embodiment of the present ink-jet printer head.

FIG. 5 shows another embodiment of the present ink-jet printer head, which is similar in many respects to the printer head shown in FIG. 4. Similarly with the embodiment of FIG. 4 and as a characteristic feature of the present invention, the pusher unit 14 is provided separately from the pressure chamber 20 and it does not form a part thereof. As shown, also in this embodiment, the pressure chamber 20 is defined as engraved in the top surface of base plate 10, so are the inlet and outlet passages 20*a* and 20*b*. However, in this embodiment, the pressure chamber 20 is located at the center of the base plate 10. In the embodiment of FIG. 5, a pair of support blocks 15*a* and 15*b* are provided as fixedly mounted on the top cover plate 11 spaced apart from each other over a predetermined distance with the pressure chamber 20 located at the center therebetween. The pusher unit 14 in the form of an elongated plate is provided with each end fixedly attached to the top of the support blocks 15*a* and 15*b*, and the pusher pin 17 is provided as fixedly connected to the pusher unit 14 and the top cover plate 11 as located midway between the supporting blocks 15*a* and 15*b*, whereby the pin 17 is positioned at the center of that portion of the top cover plate 11 which forms the ceiling of the pressure chamber 20. It will be easily understood that this printer head operates substantially in the same manner as that of the previous embodiment shown in FIG. 4.

Figure 6:
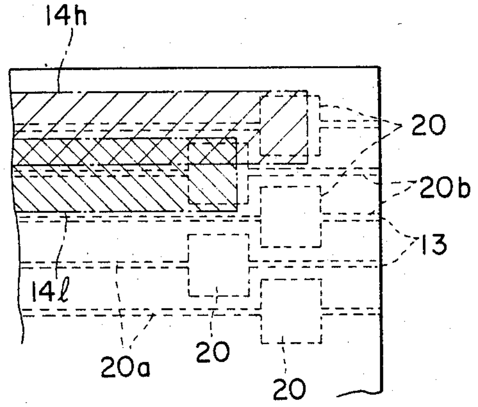
FIG. 6 is a schematic illustration showing a multi-nozzle printer head constructed in accordance with the present invention.
Figure 7:
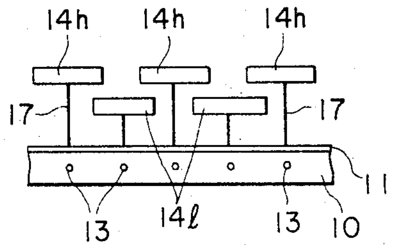
FIG. 7 is a front view of the multi-nozzle printer head of FIG. 6.

FIGS. 6 and 7 show one embodiment of the multi-nozzle ink-jet printer head constructed in accordance with one aspect of the present invention illustrated in FIG. 4. As best understood from FIG. 7, a plurality of pusher units 14 corresponding in number to the nozzles 13 arranged in the form of a single array are provided above the top cover plate 11 in two levels or staggered relationship. In FIGS. 6 and 7, those pusher units located at a first level which is separated over a predetermined distance from the surface of the top cover plate 11 are designated by "14*l*"; whereas, those pusher units located at a second level which is separated further away from the top cover plate 11 as compared with the first level are designated by "14*h*." With such a staggered arrangement, the pitch of a plurality of nozzle openings 13 may be maintained smaller thereby allowing to obtain a high resolution. Put it another way, with the pitch of the nozzle openings 13 maintained constant, each of the pusher unit 14 may be made larger so that the deflection of the pusher unit 14 may be increased. It should further be noted that, in the illustrated multi-nozzle structure, the pressure chambers 20 are also staggered in arrangement. This also contributes to maintain the pitch of the nozzle openings 13 smaller. It should be noted, however, that the present invention is not limited to such a two level structure and the pusher units 14 may be arranged in a staggered relation in more than two levels.

Figure 8:
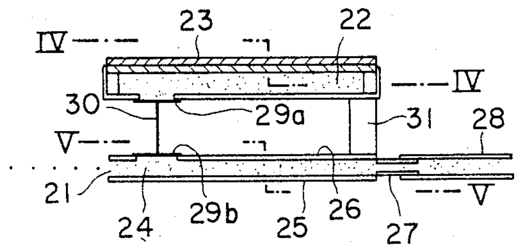
FIG. 8 is a longitudinally cross sectional view showing a further embodiment of the present ink-jet printer head.
Figure 9:
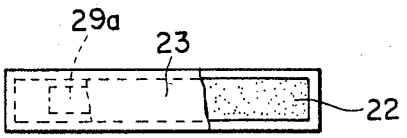
FIGS. 9 and 10 are partially cross sectional, plan views of the ink-jet printer head of FIG. 8 taken along lines IV—IV and V—V, respectively.
Figure 10:
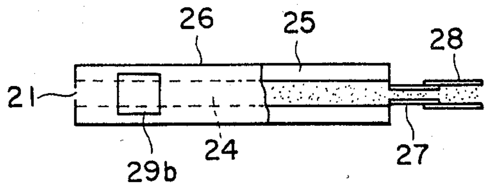

FIGS. 8–10 show a further embodiment of the present ink-jet printer head in which a separate liquid chamber 22 filled with liquid such as ink is provided. That is, the liquid chamber 22 is a sealed independent chamber filled with liquid such as ink and its one side surface, or the ceiling in the illustrated example, is formed by a pusher unit 23 comprised, for example, by including a piezoelectric or megnetostrictive element as described with respect to the previous embodiments. The separate liquid chamber 22 is fixedly supported by a support block 31 at one end and thus it is located above the top cover plate 26 of the printer head. The top cover plate 26 is fixedly attached to the top surface of a base plate 25 in which an ink passage 24 is defined. At one end of the ink passage 24 is defined a nozzle opening 21 through which the ink inside the ink passage 24 is pushed out into the air to form printing ink droplets when the pusher unit 23 is activated by a print signal supplied thereto. At the other end of the ink passage 24 is formed an ink inlet pipe 27 onto which a nozzle supply tube 28 is tightly fitted. And thus ink may be fed into the ink passage 24 from an ink reservoir (not shown) via the tube 28.

An opening is provided in the bottom wall of the liquid chamber 22 at the location closer to the free end thereof and an upper deflectable member 29*a* is fixedly mounted to seal the opening. Similarly, a lower deflectable member 29*b* is provided to form a part of the ink passage 24 opposite to the deflectable member 29*a* of the liquid chamber 22. A connection pin 30 is provided as fixedly connected to the deflectable members 29*a* and 29*b* on both ends. Such a pin 30 may be formed by a rod which is comprised of a material such as stainless steel, nickel, brass, glass and phosphor bronze. It is to be noted, however, that the pin 30 should be rigid enough to be able to transfer the pushing force or deflection from the upper deflectable member 29*a* to the lower deflectable member 29*b* without loss. On the other hand, the deflectable members 29*a* and 29*b* should be flexible enough to be easily deflected by application of force in the direction perpendicular thereto, but it must have enough resiliency or elasticity to quickly return to its original shape or position upon release of the applied force. As long as these conditions are met, the pressure members 29*a* and 29*b* may be formed by any material; for example, use may be made of a thin metal plate such as a stainless, nickel, or phosphor bronze plate.

It should further be noted that the ink passage 24 has a uniform cross sectional area throughout its length as best undertood from FIGS. 9 and 10, and no pressure chamber is positively defined by changing the cross sectional area or the width of the ink passage 24. It may be said though that a pressure chamber is defined conceptually by the existence of the deflectable member 29*b* because that portion of the ink passage 24 which is in the neighborhood of the deflectable member 29*b* receives an increased pressure when an ink droplet is to be produced. However, it is important to note that provision of a pressure chamber having an enlarged cross section is not a positive requirement in the present invention because a sufficient volume displacement can be easily obtained owing to its novel structure.

In operation, when a print signal is applied to the pusher unit 23 including a piezoelectric element, for example as a driving element, the unit 23 deflects inwardly thereby causing the upper deflectatble member 29*a* to deflect outward. Thus, the lower deflectable member 29*b* is caused to deflect inwardly through the pin 30 to reduce the volume of the ink passage 24 and thus the ink inside of the ink passage 24 is partly discharged into the air through the opening 21 to produce a printing ink droplet. In the present embodiment, since the separate liquid chamber 22 is provided as a driving unit of the deflectable member 29*b*, it may be made as large as desired so as to obtain an enhanced pushing force. In other words, even if the deflection of the pusher unit 23 is rather small, an increased deflection may be obtained by the deflectable member 29*a* and also by the member 29*b* because the pusher unit 23 has a larger contact surface with the liquid sealed in the chamber 22.

Figure 11:
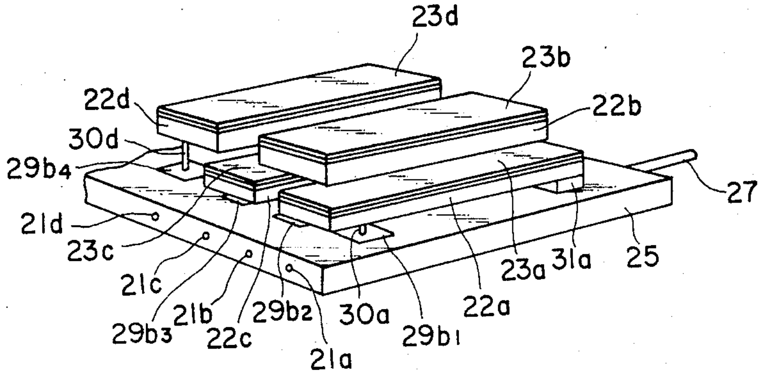
FIG. 11 is a perspective view showing a multi-nozzle ink-jet printer head constructed in accordance with the concept of the present invention illustrated in FIGS. 8–10.
Figure 12:
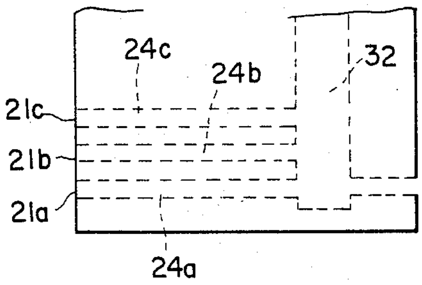
FIG. 12 is a schematic illustration showing the arrangement of ink passages defined in the base plate of the multi-nozzle ink-jet printer head shown in FIG. 11.

FIG. 11 illustrates an embodiment of the multi-nozzle printer head constructed in accordance with the present invention utilizing the concept shown in FIGS. 8–10. Similarly with the previous multi-nozzle embodiment, the pusher units or liquid chambers are arranged in a staggered relation in two levels. With such a structure, even if the pusher units and thus the liquid chambers are made larger-sized so as to attain an increased pushing force, the pitch of the nozzle openings 21 may be maintained unchanged or may be made smaller, if desired. And thus, this structure also allows to make a high density multi-nozzle printer head. This will be easily appreciated when reference is made to FIG. 12 which shows the arrangement of the ink passages 24 defined in the base plate 25 of the multi-nozzle embodiment shown in FIG. 11. As shown, the ink passages 24 may be located much closer together in this embodiment since no well-defined pressure chambers are provided. This indicates an additional advantage in forming a high density multi-nozzle printer head.

As an alternative embodiment, instead of providing the piecemeal deflectable member or members 29*b*, the entire top cover plate 26 may be formed by such a deflectable member. In this case, the deflectable top cover plate is locally deflected at the location of connection with the pusher pin 30 and its surrounding.

Figure 13:
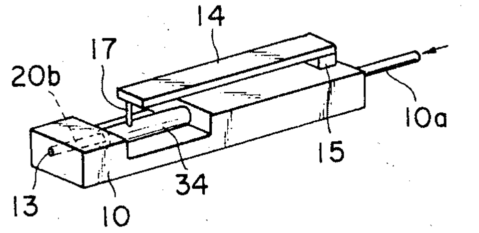
FIGS. 13 and 14 are perspective views showing still further embodiments of the present invention.
Figure 14:
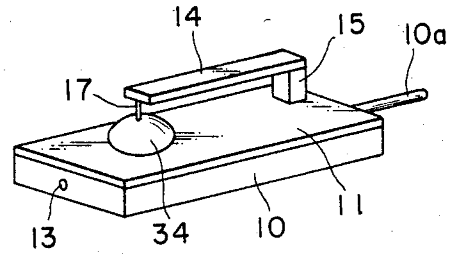

FIGS. 13 and 14 show still further embodiments of the present ink-jet printer head. These embodiments are similar in many respects to the embodiment shown in FIG. 4, and, therefore, identical numerals are used to indicate identical elements and a description therefor will be omitted. The common feature of these embodiments of FIGS. 13 and 14 which is absent in the embodiment of FIG. 4 is that the pressure chamber or ink passage is at least partly defined by a curved deflectable member, such as a tubular, semi-tubular, spherical, semi-spherical, oval or dome shaped deflectable member. When the pressure chamber or ink passage is defined by a curved deflectable member at least partly and one end of the pusher pin 17 is fixedly connected, preferably, to the top of the curved member, a required volume displacement may be easily obtained. As shown, FIG. 13 shows an embodiment when a tubular deflectable member 34 is employed. Such a tubular member 34 may have either the same or larger cross section as compared with the inlet and outlet passages defined in the base plate 10. FIG. 14 shows an embodiment in which use is made of a semi-spherical or dome shaped deflectable member 34. In this case, the pressure chamber is defined by the volume of the dome shaped portion. Any flexible or elastic material may be used for the curved flexible member 34.

Figure 15:
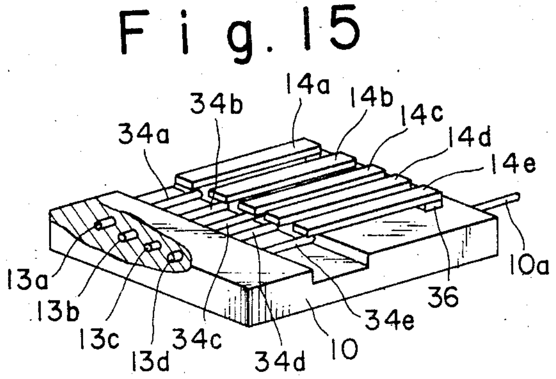
FIGS. 15 and 16 are perspective views showing multi-nozzle ink-jet printers constructed in accordance with the concept of the present invention shown in FIGS. 15 and 16, respectively.
Figure 16:
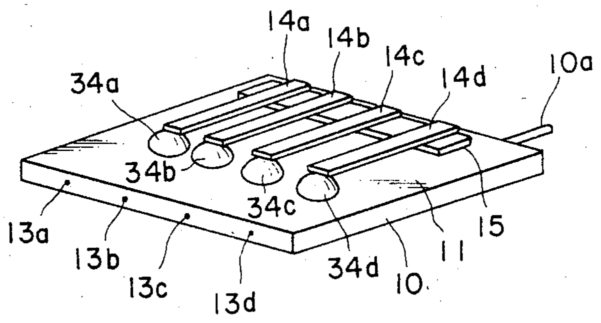

FIGS. 15 and 16 show multi-nozzle embodiments of the present invention constructed on the basis of the concept illustrated in FIGS. 13 and 14, respectively. In these embodiments, a plurality of pusher units 14 are arranged in the same single plane; however, it should be noted that they may be arranged in a staggered relation in multiple levels so as to enhance integration as explained with respect to the previous embodiments. In particular, in the embodiment of FIG. 16, a plurality of dome shaped deflectable members 34 may also be arranged as staggered on the same plane in a similar manner as shown in FIG. 6 so as to further enhance the degree of integration.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ink-jet printer head for producing ink droplets to be used in printing, comprising:

ink holding means provided with an inlet, a nozzle opening and an ink passage extending between said inlet and said nozzle opening for holding ink in said ink passage as supplied through said inlet to be ejected through said nozzle opening, said ink holding means also including a deflectable area of predetermined shape as part of said ink passage;

driving means having a generally elongated shape overlying at a selected height above and in a plane substantially parallel to said ink passage and being supported for producing a bending deflection at a driving end thereof in the direction substantially perpendicular to said plane toward said deflectable area in response to a print signal supplied thereto, said driving means being substantially longer than said deflectable area of said ink holding means and having a base end which is fixedly attached to said ink holding means at a location substantially separated away from said deflectable area; and connection means provided between said deflectable area of said ink holding means and the driving end of said driving means for transmitting the deflection of said driving means to said deflectable area of said ink holding means to change the volume of said ink passage at least partly thereby causing said ink inside of said ink passage to be ejected through said nozzle opening at least partly to produce an ink droplet.

2. An ink-jet printer head of claim 1 wherein said ink holding means includes a pressure chamber defined partly in said ink passage as said deflectable area, said pressure chamber having a larger cross sectional area than that of said ink passage, and said connection means being so connected to change the volume of said pressure chamber when said driving means is deflected.

3. An ink-jet printer head of claim 1 wherein said driving means includes an electromechanical element which is deflectable in response to an electrical print signal supplied thereto.

4. An ink-jet printer head of claim 3 wherein said electromechanical element is an elongated piezoelectric element.

5. An ink-jet printer head of claim 4 further comprising supporting means fixedly mounted on said ink holding means for fixedly supporting one end of said driving means in a cantilever fashion.

6. An ink-jet printer head of claim 5 wherein said connection means is fixedly connected to the free end of said cantilever-like supported driving means.

7. An ink-jet printer head of claim 4 further comprising supporting means fixedly mounted on said ink holding means for fixedly supporting opposite ends of said driving means in a bridge fashion.

8. An ink-jet printer head of claim 7 wherein said connection means is fixedly connected to said driving means at the position midway between the opposite ends thereof.

9. An ink-jet printer head of claim 3 wherein said driving means further includes an independent liquid chamber, filled with liquid, whose one surface is defined by said electromechanical element and whose another surface is defined by a first deflectable member whereby said connection means is fixedly connected to said first deflectable member.

10. An ink-jet printer head of claim 9 wherein said one surface is larger than said another surface.

11. An ink-jet printer head of claim 9 wherein said ink holding means includes a second deflectable member defining at least a part of the surface of said ink passage and said connection means is fixedly connected to said second deflectable member whereby the volume of said ink passage is changed when said second deflectable member is deflected.

12. An ink-jet printer head of claim 1 wherein said ink holding means including a curved deflectable member which partly defines the surface of said ink passage and said connection means is fixedly connected to said curved deflectable member whereby the volume of said ink passage is changed when said curved deflectable member is deflected.

13. An ink-jet printer head of claim 12 wherein said connection means is fixedly connected to the top of said curved deflectable member.

14. A multi-nozzle ink-jet printer head for producing ink droplets to be used for printing, comprising:

ink holding means provide with an inlet, a plurality of nozzle openings arranged in the form of an array and a like plurality of ink passages each extending between said inlet and the corresponding one of said plurality of nozzle openings for holding ink in said plurality of ink passages as supplied through said inlet to be ejected through said nozzle openings, said ink holding means also including a like plurality of deflectable area of predetermined shape, each of which is defined as part of the corresponding one of said plurality of ink passages;

a plurality of pusher units having a generally elongated shape and being arranged in a staggered relation at least in two levels different in height above and overlying said ink holding means, each of said pusher units extending substantially longer than said deflectable area of the corresponding ink passage and substantially in parallel with the corresponding ink passage, having a base end which is fixedly attached to said ink holding means at a location substantially separated away from the corresponding one of said plurality of deflectable areas and producing a deflection at a driving end in the direction substantially perpendicularly toward said deflectable area in response to a print signal supplied thereto; and a plurality of connection members each connected between the driving end of the corresponding pusher unit and said deflectable area of the corresponding ink passage of said ink holding means for transmitting the deflection of said pusher unit to said deflectable area to change the volume of said corresponding ink passage at least partly thereby causing said ink inside of said corresponding ink passage to be ejected through said corresponding nozzle opening at least partly to produce an ink droplet.

* * * * *